United States Patent
Zapletal et al.

(10) Patent No.: US 12,068,586 B2
(45) Date of Patent: Aug. 20, 2024

(54) SWITCH CABINET WITH A FRAME AND A SIDEWALL ELEMENT MOUNTED THEREON

(71) Applicant: RITTAL GMBH & CO. KG, Herborn (DE)

(72) Inventors: Rebecca Zapletal, Siegen (DE); Carsten Bäumer, Freudenberg (DE)

(73) Assignee: RITTAL GMBH & CO. KG (DE)

( * ) Notice: Subject to any disclaimer, the term of this patent is extended or adjusted under 35 U.S.C. 154(b) by 440 days.

(21) Appl. No.: 17/428,307

(22) PCT Filed: Dec. 9, 2019

(86) PCT No.: PCT/DE2019/101059
§ 371 (c)(1),
(2) Date: Aug. 4, 2021

(87) PCT Pub. No.: WO2020/160716
PCT Pub. Date: Aug. 13, 2020

(65) Prior Publication Data
US 2022/0131348 A1   Apr. 28, 2022

(30) Foreign Application Priority Data
Feb. 7, 2019   (DE) ................. 10 2019 103 075.7

(51) Int. Cl.
*H02B 1/00*   (2006.01)
*H02B 1/30*   (2006.01)

(52) U.S. Cl.
CPC .................... *H02B 1/306* (2013.01)

(58) Field of Classification Search
CPC ........ H02B 1/306; H02B 1/301; H02B 1/014; H02B 1/012; H05K 7/183; H05K 7/1488;
(Continued)

(56) References Cited

U.S. PATENT DOCUMENTS

| | | | | |
|---|---|---|---|---|
| 6,238,027 | B1 * | 5/2001 | Kohler | E05D 5/023 312/265.3 |
| 7,264,321 | B1 * | 9/2007 | Bueley | E05D 7/123 312/265.5 |

(Continued)

FOREIGN PATENT DOCUMENTS

| | | | |
|---|---|---|---|
| DE | 19520084 | * | 7/1996 |
| DE | 19647814 | * | 5/1998 |

(Continued)

OTHER PUBLICATIONS

International Search Report (in English and German) and Written Opinion of the ISA (in German) issued in PCT/DE2019/101059, mailed Feb. 7, 2020; ISA/EP.

(Continued)

*Primary Examiner* — Janet M Wilkens
(74) *Attorney, Agent, or Firm* — Harness, Dickey & Pierce, P.L.C.

(57) ABSTRACT

A switch cabinet having a frame and a sidewall element mounted thereon, wherein the sidewall element is mounted on the frame via at least one latch lock, the latch lock having a latch and a latch receptacle one of which is fixed to the frame and the other of which is fixed to the sidewall element and which are accommodated in a volume which is open towards an outer side of the frame and which is delimited on the one hand by a folded profile edge of the frame and on the other hand, adjoining the folded profile edge on the outer side, by the sidewall element.

14 Claims, 5 Drawing Sheets

(58) Field of Classification Search
CPC ...... H05K 7/18; H05K 7/1401; H05K 7/1489;
H05K 5/023; H05K 5/0008; H05K 5/027;
F16B 2/18; F16B 2/185; A47B 47/0083;
A47B 57/54; A47B 96/06; A47B 96/14;
A47B 96/1441
USPC ............... 312/223.1, 265.1–265.6, 244, 140;
174/50; 211/26, 26.1
See application file for complete search history.

(56) References Cited

U.S. PATENT DOCUMENTS

| | | |
|---|---|---|
| 2001/0049950 A1 | 12/2001 | Finch |
| 2002/0084728 A1* | 7/2002 | Elm ...................... E05B 53/005 |
| | | 312/222 |
| 2009/0236957 A1 | 9/2009 | Hudz et al. |
| 2011/0316402 A1* | 12/2011 | Hsiao ...................... H05K 7/18 |
| | | 312/326 |
| 2012/0274086 A1 | 11/2012 | Fath |
| 2016/0352080 A1* | 12/2016 | Brueck .................. H02B 1/013 |
| 2017/0042057 A1 | 2/2017 | Segroves et al. |

FOREIGN PATENT DOCUMENTS

| | | | |
|---|---|---|---|
| DE | 19801720 | * | 7/1999 |
| DE | 10058260 C1 | | 8/2002 |
| DE | 102014101404 A1 | | 8/2015 |
| EP | 09448107 | * | 10/1999 |
| EP | 2518242 A2 | | 10/2012 |
| EP | 3159466 A1 | | 4/2017 |
| WO | 2008124911 | * | 10/2008 |

OTHER PUBLICATIONS

German International Preliminary Report on Patentability issued in PCT/DE2019/101059, dated Dec. 23, 2020; ISA/EP.

* cited by examiner

Fig. 5

SWITCH CABINET WITH A FRAME AND A SIDEWALL ELEMENT MOUNTED THEREON

CROSS-REFERENCE TO RELATED APPLICATIONS

This application is a U.S. National Phase Application under 35 USC 371 of International Application No. PCT/DE2019/101059, filed on Dec. 9, 2019, which claims the benefit of German Application No. 10 2019 103 075.7, filed on Feb. 7, 2019. The entire disclosures of the above applications are incorporated herein by reference.

BACKGROUND

This section provides background information related to the present disclosure which is not necessarily prior art.

TECHNICAL FIELD

The invention is based on a switch cabinet, for example, an IT cabinet, an IT rack, a 19" switch cabinet or the like, with a frame and at least one sidewall element mounted thereon. Such a switch cabinet is known from DE 10 2014 101 404 A1.

DISCUSSION

In switch cabinets known from the prior art, the sidewall elements are screwed to the frame or locked with a simple lock with key lock accessible from the outside. However, this does not provide permanent access protection to the interior of the switch cabinet, although IT cabinets, for example, are often equipped with front and rear doors that are usually fitted with security profile cylinders, whereas the side panel lock does not achieve such a security level due to its design. Screws can be loosened with standard tools and the key locks used in this area have only a simple coding or a standard coding that is available a million times over.

SUMMARY

This section provides a general summary of the disclosure, and is not a comprehensive disclosure of its full scope or all of its features.

It is therefore one aspect of the invention to further develop the switch cabinet described at the beginning in such a way that it has increased access protection, in particular via the sidewalls of the switch cabinet.

Accordingly, it is provided that the sidewall element is mounted on the frame via at least one latch lock, the latch lock having a latch and a latch receptacle, the first of which is fixed to the frame and the other to the sidewall element. The latch and the latch receptacle are accommodated in a volume open towards an outer side of the frame element, which volume is delimited on the one hand by a folded profile edge of the frame element and on the other hand by the sidewall element adjacent to the folded profile edge on the outer side.

By using the latch lock, it can be achieved that the fastening of the sidewall element to the frame is possible without the use of fasteners or the like that are accessible from the outside of the enclosure. As a result, the attachment of the sidewall element can further be accomplished without the use of tools. For example, the latch receptacle can be mounted on an inner side facing the interior of the switch cabinet in the edge region of the sidewall element. For this purpose, the sidewall element can have threaded bolts welded onto the inside, for example.

The switch cabinet according to the invention enables the realization of embodiments which do not require any post-processing of the sidewall element for fastening the sidewall elements to the frame. In particular, it is not necessary to make openings in the sidewall element, for example for mounting key locks or the like.

In particular, the latch lock can be arranged completely inside the switch cabinet and thus inaccessible from outside the switch cabinet when it is closed. For the re-release of the latch lock, i.e. for the separation of the latch and latch receptacle, one of the latch and latch receptacle can have a manual actuating element with the aid of which the latch projection of the latch is pulled out of the latch receptacle. For example, the latch may have a latch projection that is biased by a spring bias to a locking position in which the latch projection protrudes a maximum length from a housing of the latch. The actuating element can be arranged on a side of the latch facing the interior of the switch cabinet and thus be easily accessible inside the switch cabinet.

The folded profile edge can have two profile sides that merge into one another via an edging, preferably a 90° edging, of which a first profile side is a sealing web that ends in a sealing plane of the frame lying in the outer side.

The latch receptacle can rest against the profile edge, in particular against the first profile side, such as the sealing web, so that additional stabilization and locking of the sidewall element with respect to the frame member is achieved. If the latch receptacle is arranged in a corner region of the frame structure, in which two profile struts of the frame structure that are perpendicular to one another meet, the latch receptacle can rest against the first two profile sides of both profile struts with two outer contact surfaces that run perpendicular to one another, so that to this extent locking of the sidewall element in the plane of the sidewall element is already achieved.

Of the two sides of the profile, a second side of the profile can have a mounting plane facing the sidewall element with fastening receptacles, which is set back relative to the sealing plane and is preferably spaced apart from it by a dimension of the volume in parallel.

The volume can, for example, be formed by that area which is arranged between the mounting plane and the sealing plane, insofar as this is delimited by the folded profile edge on the one hand and the sidewall element on the other. The latch lock, in particular the latch and/or the latch receptacle of the latch lock, do not necessarily have to be arranged completely within the volume. For example, it may be provided that that component of the latch and latch receptacle which is fixed to the frame member has a fixing portion with which it at least partially embraces a frame profile of the frame member. For example, it can be provided that the component of latch and latch receptacle which is fixed to the frame, preferably a housing of the component in question, embraces a rectangular profile section of the frame.

The latch may have a housing via which it is secured to the frame member. The latch receptacle can have at least one through-hole via which it is screwed to the sidewall element.

The housing can have an actuating element on a side facing away from the sidewall element, by means of which a latch projection which can be adjusted with respect to the housing can be adjusted from a locking position, in which the latch projection projects into the latch receptacle, to a release position, in which the latch projection is positioned in front of the latch receptacle.

The housing may have a latch guide open to a first housing exterior for a latch projection of the latch that is adjustable relative to the housing. The latch guide may be disposed in the volume and may include a linear guide for the latch projection. The latch guide may be configured as the linear guide. The latch guide may be formed as a recess of the housing that is open to the first housing exterior and has its opening facing the latch receptacle.

It can further be provided that along the latch guide a latch projection can be adjusted parallel to the sidewall element and/or the profile edge between a locking position, in which the latch projection is received in the latch receptacle, and a release position, in which the latch projection is positioned in front of the latch receptacle.

The housing may include a groove extending continuously between the first and an opposing second outer side of the housing and open to those sides, the open longitudinal side of the groove being disposed in a further side of the housing connecting the opposing outer sides of the housing.

The groove of the housing can embrace a rectangular profile section of the frame and form a form-fit receptacle for the form-fit reception of the frame, wherein locking means are arranged in the form-fit receptacle, which are locked in fastening receptacles of the rectangular profile section.

The housing can have a screw channel that is aligned with a fastening receptacle of the folded profile edge when the housing is placed on the frame via the form-fit receptacle and latched to the frame via the latching means.

The housing can have a housing section with a through screw channel, which is open via its opposite openings on the one hand to the outside of the frame and on the other hand to a mounting plane of the folded profile edge, which has fastening receptacles.

The screw channel may extend, optionally exclusively, through the volume and a fastening screw may be inserted into the screw channel from the outside and screwed into one of the fastening receptacles so that a screw head of the fastening screw faces the sidewall element and is thus covered by the sidewall element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained with reference to the figures below. Thereby shows.

DETAILED DESCRIPTION

Example embodiments will now be described more fully with reference to the accompanying drawings.

Figure 1:
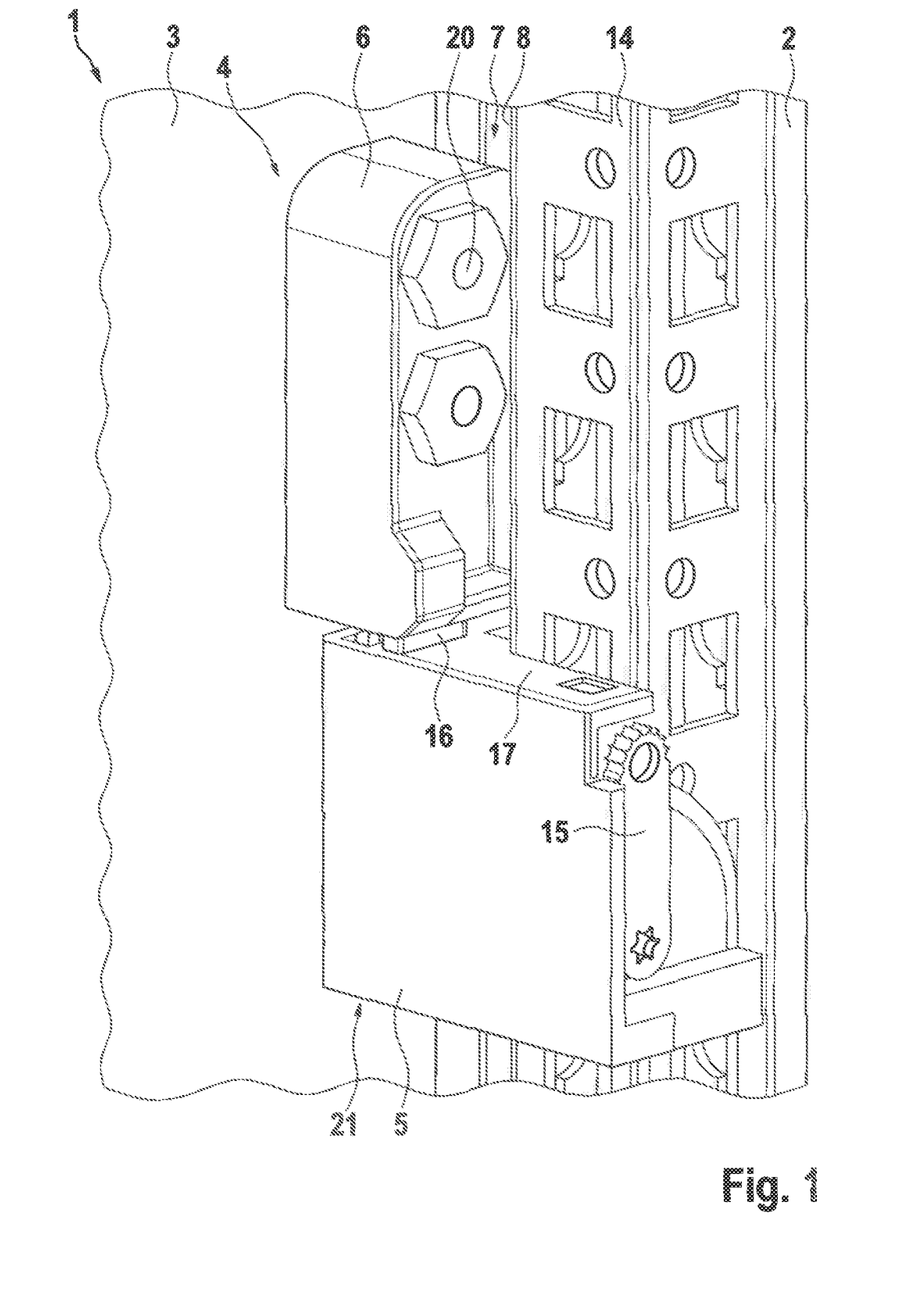
FIG. 1 a detailed view of an exemplary embodiment of a switch cabinet according to the present invention.

FIG. 1 shows a first exemplary embodiment of a switch cabinet 1 according to the invention. The switch cabinet 1 essentially comprises a switch cabinet frame 2 with four vertical and eight horizontal profile struts. A sidewall element 3 is mounted on an outer side of the frame rack 2. Frame racks suitable for implementing the invention with sidewall elements fixed thereto are also described in DE 10 2014 101 404 A1.

A free volume 7 is formed between a rectangular profile section 14 of a vertical strut of the frame 2 and the inside of the sidewall element 3, which volume is accessible from the outside of the frame 2 when the sidewall element is dismantled and, according to the invention, is used to implement a latch lock 4 for fastening the sidewall element 3 to the outside of the frame 2, which latch lock 4 is inaccessible from the outside. The latch lock 4 essentially comprises a latch 5 and a latch receptacle 6. The latch 5 in turn has a latch projection 16 which can be adjusted in its longitudinal direction, which in the present case corresponds to the vertical direction, and is prestressed by means of a mechanical prestress, for example a spring prestress, into the locking position shown in FIG. 1, in which the latch projection 16 projects from below into the latch receptacle 6 arranged above the latch 5.

While the latch 5 embraces the rectangular profile section 14 and is firmly screwed to the frame structure, in particular the rectangular profile section 14, via a screw connection not shown, the latch receptacle 6 has two bolt connections to the sidewall element 3, which are implemented with the aid of two weld-on bolts 20 welded onto the inside of the sidewall element 3. When the latch projection 16 is thus accommodated in the latch receptacle 6, preferably in a form-fitting manner, the sidewall element 3 is fixed to the frame 2 at least in the direction perpendicular to the plane of the sidewall element 3.

The latch 5 has an actuating element 15 by means of which the latch projection 16 can be moved from the locking position shown in FIG. 1, in which the latch projection 16 projects into the latch receptacle 6, to a release position in which the latch projection 16 is positioned in front of the latch receptacle 6.

Figure 2:
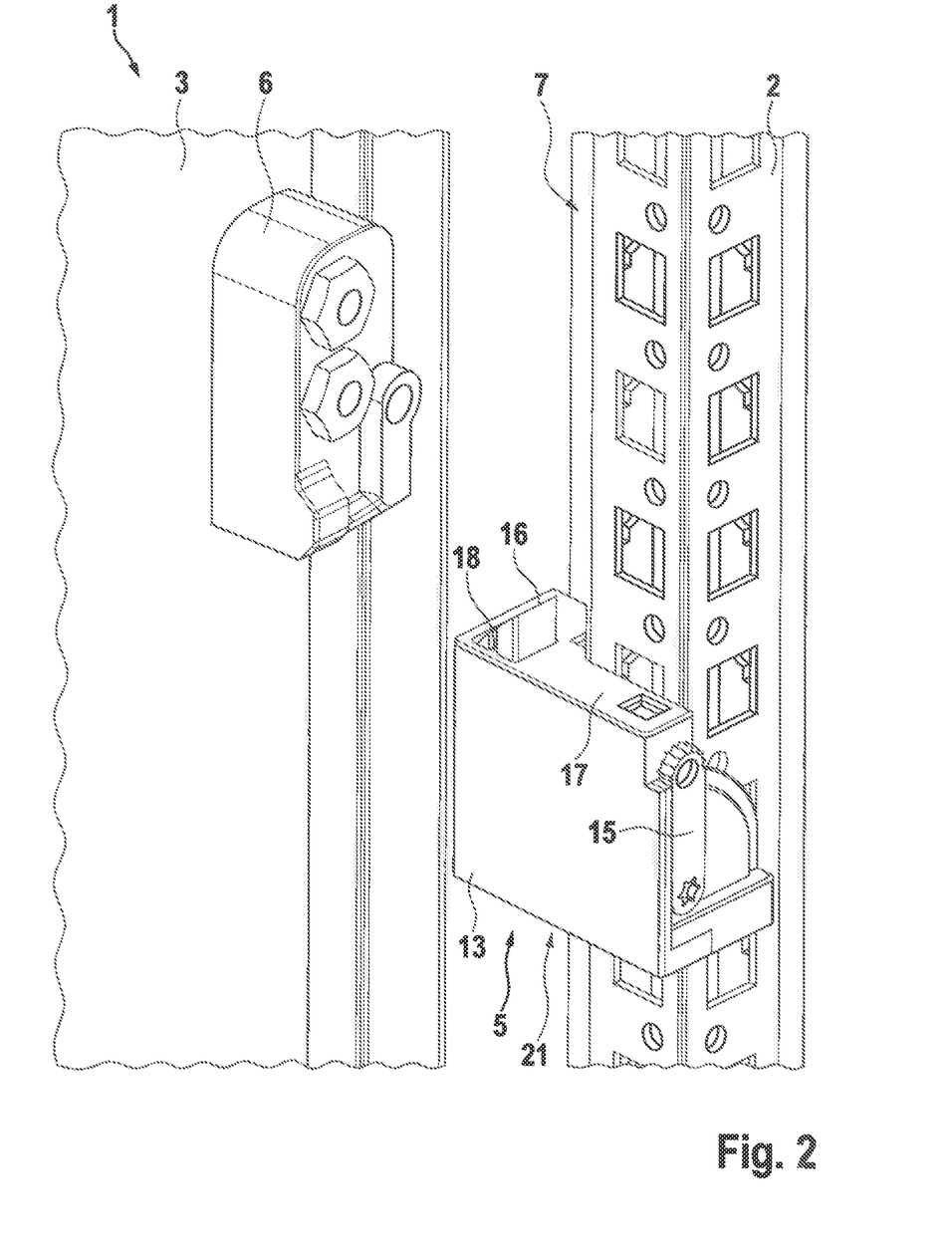
FIG. 2 a detailed view of a further embodiment of a switch cabinet according to the invention with a latch separate from the latch receptacle.

FIG. 2 shows an embodiment of a switch cabinet 1 according to the invention, in which the sidewall element 3 with the latch receptacle 6 attached to it via its inner side has been separated from the frame 2, or before the sidewall element 3 has been mounted on the frame 2. Due to its mechanical pretension, the latch projection 16 is extended by its maximum length from the housing 13 of the latch 5 in this state. The latch projection 16 has a run-up slope on its side facing the inside of the sidewall 3.

The housing 13 has an upper housing outer side 17, to which a latch guide 18 is open. The latch guide 18 accommodates the latch projection 16 so that it can be adjusted in the vertical direction relative to the housing 13. The latch guide 18 is formed as a recess of the housing 13, which is open towards the first housing side 17 and with its opening facing the latch receptacle 6, when the latch receptacle 6 has been brought closer to the frame 2 and thus to the latch 5 in the manner shown in FIG. 1.

The embodiment according to FIG. 3 again shows a frame 2 in which a vertical strut of the frame 2 is shown in horizontal cross section. The vertical strut has a rectangular profile section 14 which is embraced by the latch 5, in particular by the housing 13 of the latch 5. The latch 5 is partially accommodated in a volume 7 which is delimited between a folded profile edge 8 of the frame 2 and a sidewall element (not shown) which can be mounted via the sealing plane D. The folded profile edge 8 has two profile sides 10, 11 which merge into one another via an edging 9, in this case a 90° edging, of which a first profile side 10 is the sealing web which ends in a sealing plane D of the frame 2 lying in the outer side. The second profile side 11 has a mounting plane M facing the sidewall element 3 with fastening receptacles 12, which is set back relative to the sealing plane D in the direction of the enclosure interior and is spaced parallel from the sealing plane D by a dimension of the volume perpendicular to the plane of the sidewall element 3 (compare FIGS. 1 and 2).

Figure 3:
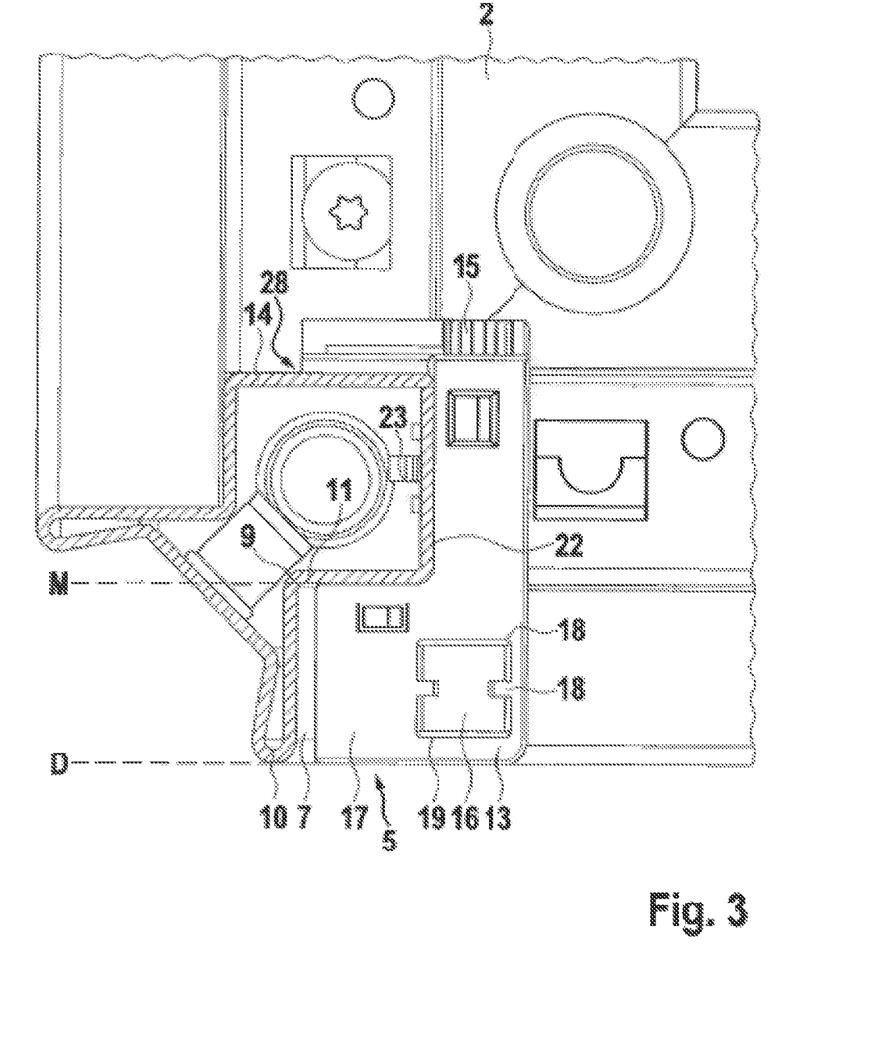
FIG. 3 a horizontal cross-section through a vertical profile strut of the switch cabinet according to a third embodiment.

An actuating element 15 for unlocking the latch projection 16 from the latch receptacle 6 is arranged on an outer side of the latch 5 facing away from the sealing plane D, so that the actuating element 15, which is in the form of an actuating lever, can be reached conveniently from inside the switch cabinet 1. The housing 13 of the latch 5 has a groove 22 extending continuously between the first outer side 17 and the second outer side 21 of the housing 13 and open towards these opposite sides 17, 21. An open longitudinal side 28 of the groove 22 is disposed in a further side of the housing 13 connecting the opposite outer sides 17, 21 of the housing 13 and facing the first profile side 10. The groove 22 embraces a rectangular profile section 14 of the frame 2 and forms a form-fitting receptacle for the form-fitting reception of the frame 2, in particular of the rectangular profile section 14.

Figure 4:
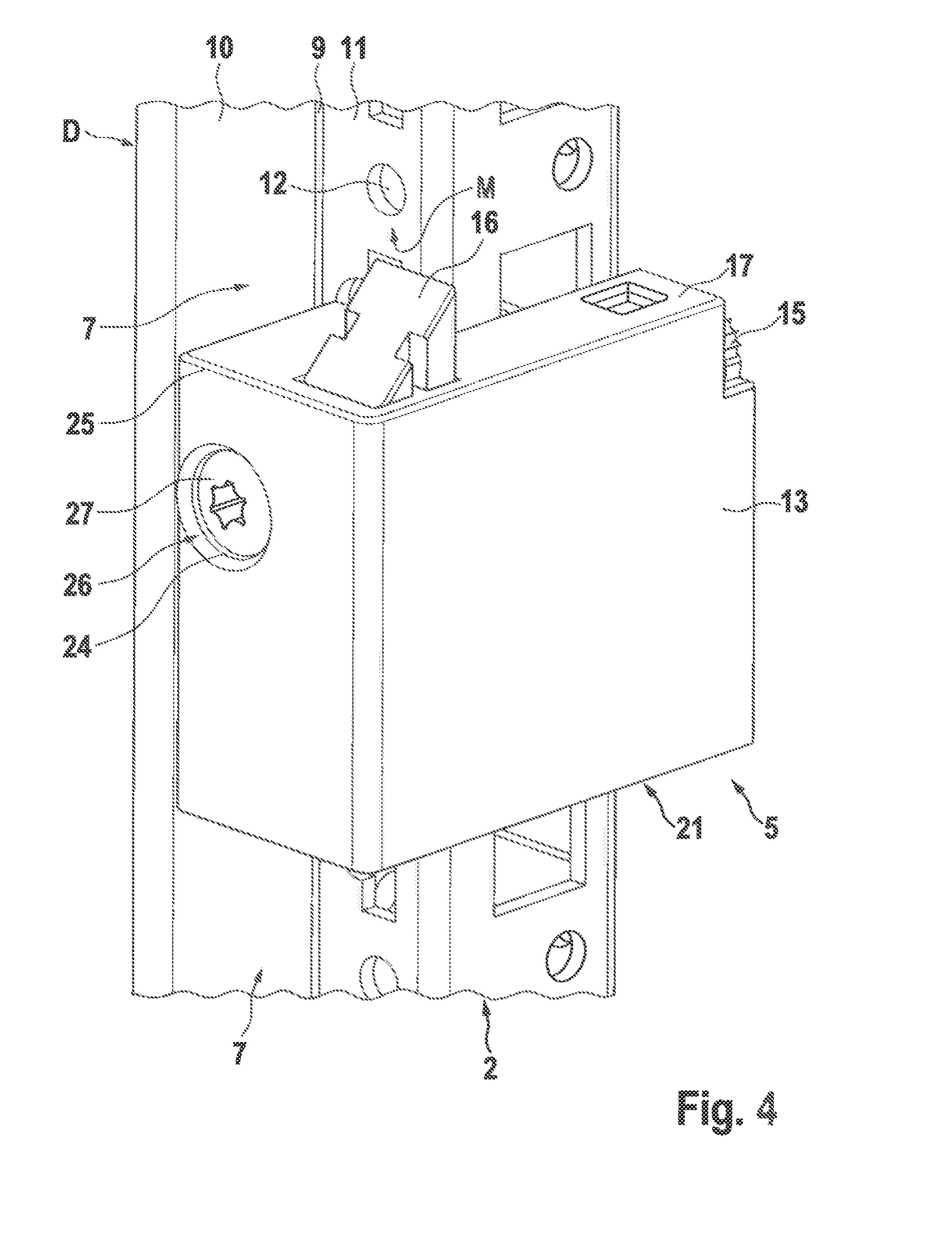
FIG. 4 a perspective view of a latch mounted on a vertical profile strut according to a further embodiment of the invention.
Figure 5:
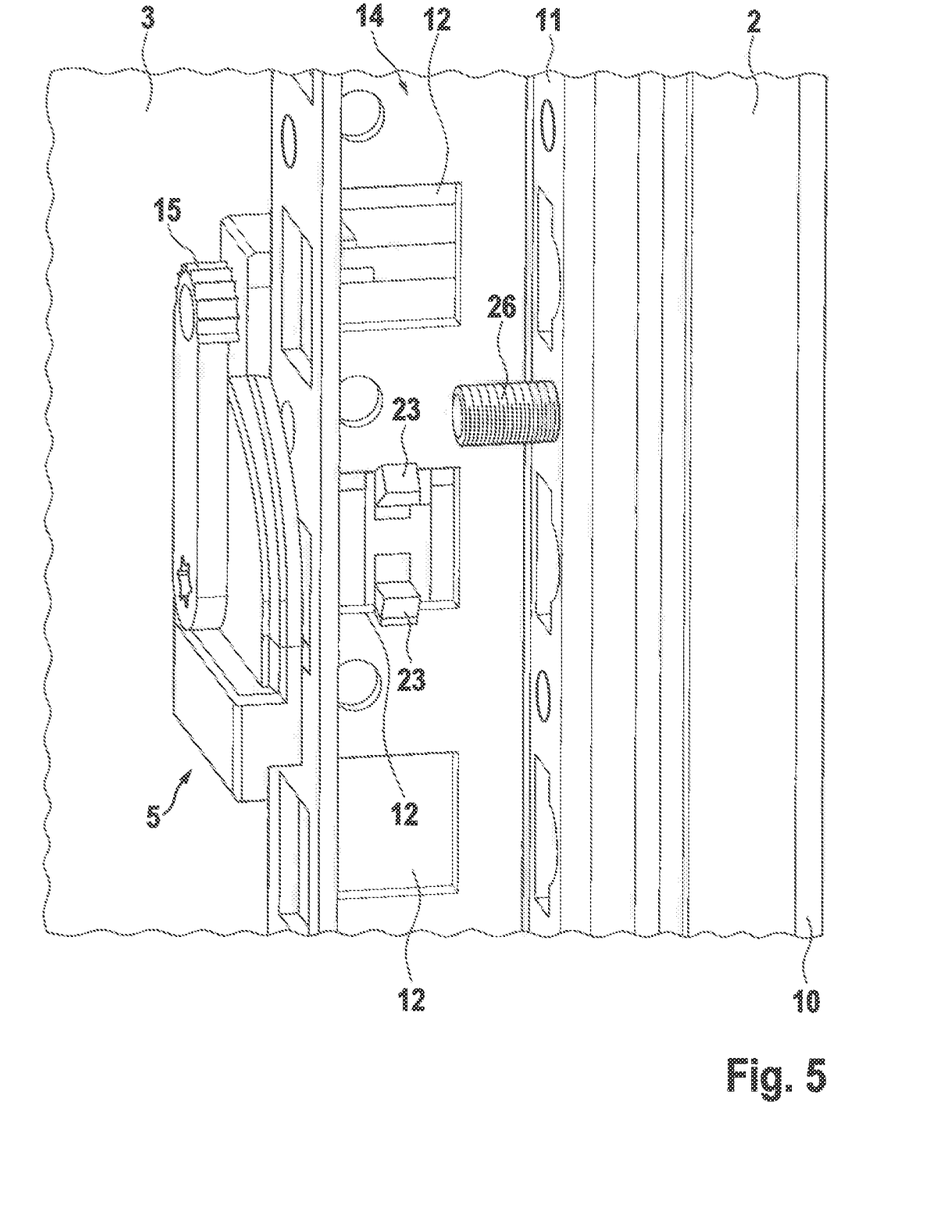
FIG. 5 a perspective view of a further detailed view of the embodiment according to FIG. 4 with the profile strut cut away and a view of the inside of the sidewall element.

As shown in FIG. 5, latching means 23 may be arranged in the form-fitting receptacle, which latch into fastening receptacles 12 of the rectangular profiled section 14. In the synopsis of FIGS. 4 and 5, it can further be seen that the latch 5, in particular the housing 13 of the latch 5, can have a housing section 25 which has a through screw channel 24 which is open via its opposite openings, on the one hand, to the outside of the frame 2, consequently to the sealing plane D, and, on the other hand, to the mounting plane M of the folded profile edge 8, in particular to the second profile side 11. The further profile side 11 has fastening receptacles 12 via which the latch 5 can be screwed to the frame 2 with the aid of the screw 26. The screw channel 24 extends through the volume 7 and the fastening screw 26 is inserted into the screw channel 24 from the outside, i.e. via the sealing plane D, and screwed into one of the fastening receptacles 12 of the second profile side 11, so that a screw head 27 of the fastening screw 26 is concealed by the sidewall element when the sidewall element is mounted.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet comprising a frame and a sidewall element mounted thereon, wherein the sidewall element is mounted on the frame via at least one latch lock, the latch lock having a latch and a latch receptacle one of which is fixed to the frame and the other of which is fixed to the sidewall element and which are accommodated in a volume which is open towards an outer side of the frame and which is delimited on the one hand by a folded profile edge of the frame and on the other hand, adjoining the folded profile edge on the outer side, by the sidewall element, wherein a housing of that part of the latch and latch receptacle which is fixed to the frame embraces a rectangular profile section of the frame.

2. The switch cabinet according to claim 1, in which the folded profile edge has two profile sides which merge into one another via an edging, of which a first profile side is a sealing web which ends in a sealing plane of the frame lying in the outer side.

3. The switch cabinet according to claim 2, in which a second profile side of the two profile sides has a mounting plane facing the sidewall element and having fastening receptacles, which mounting plane is set back relative to the sealing plane and is spaced apart from the latter in parallel by a dimension of the volume.

4. The switch cabinet of claim 2 wherein the edging is a 90° edging.

5. The switch cabinet according to claim 1, wherein the latch is fixed to the sidewall element frame.

6. The switch cabinet according to claim 5, in which the housing has a latch guide which open towards a first housing outer side for a latch projection of the latch which can be adjusted relative to the housing.

7. The switch cabinet according to claim 6, wherein the latch guide is arranged in the volume and comprises a linear guide for the latch projection.

8. The switch cabinet according to claim 6, wherein the latch guide is formed as a recess of the housing which is open towards the first housing outer side and with its opening facing the latch receptacle.

9. The switch cabinet according to claim 6, in which a latch projection can be adjusted along the latch guide parallel to the sidewall element and/or the folded profile edge between a locking position, in which the latch projection is received in the latch receptacle, and a release position, in which the latch projection is positioned in front of the latch receptacle.

10. The switch cabinet according to claim 6, wherein the housing comprises a groove extending continuously between the first and an opposite further outer side of the housing and open to these sides, an open longitudinal side of which groove is arranged in a further side of the housing which connects the opposite outer sides of the housing to one another.

11. The switch cabinet according to claim 10, in which the groove of the housing embraces a rectangular profile section of the frame and forms a form-fitting receptacle for the form-fitting reception of the frame, latching means being arranged in the form-fitting receptacle and latching into fastening receptacles of the rectangular profile section.

12. The switch cabinet according to claim 11, in which the housing has a screw channel which is aligned with a fastening receptacle of the folded profile edge when the housing is placed on the frame via the form-fit receptacle and latched to the frame via the latching means.

13. The switch cabinet according to claim 5, in which the housing has a housing section with a through screw channel which is open via its opposite openings, on the one hand, to the outside of the frame and, on the other hand, to a mounting plane of the folded profile edge, which has fastening receptacles.

14. The switch cabinet according to claim 13, wherein the screw channel extends through the volume and a fastening screw is inserted into the screw channel from the outside and screwed into one of the fastening receptacles so that a screw head of the fastening screw is covered by the sidewall element.

\* \* \* \* \*